(No Model.)
H. F. MANN.
MACHINE FOR MAKING CAR WHEELS.
No. 414,423. Patented Nov. 5, 1889.
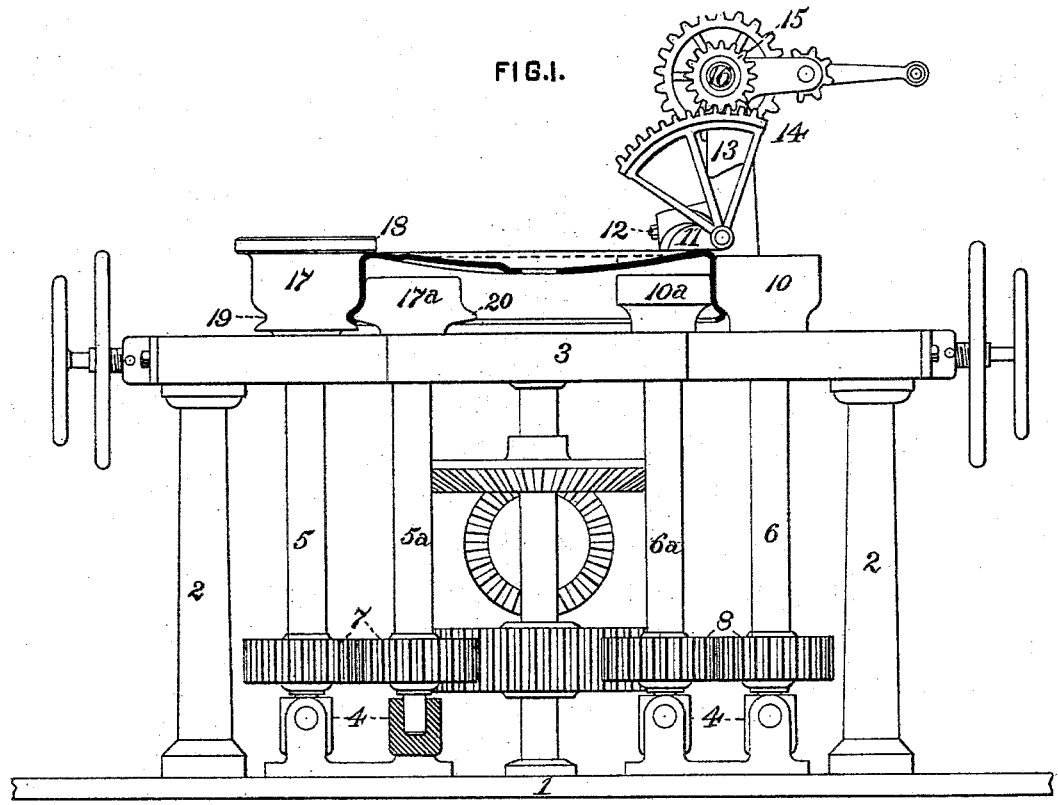
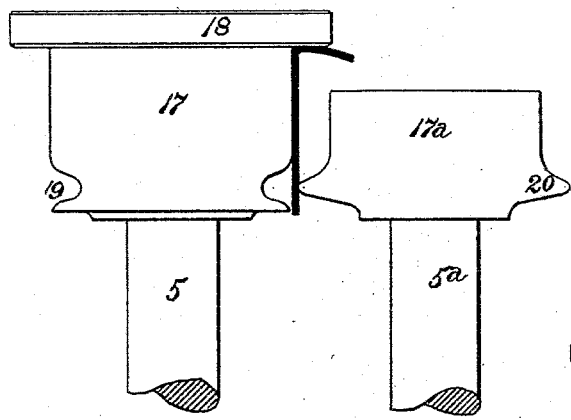
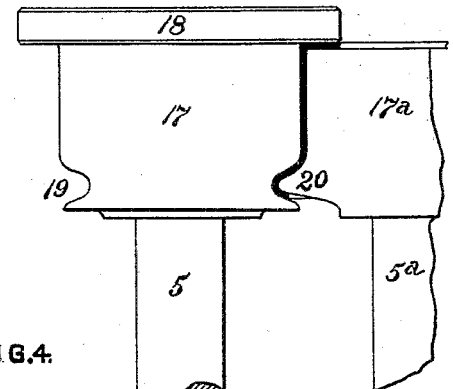
WITNESSES:
Darwin S. Wolcott
F. E. Gaither
INVENTOR,
Henry F. Mann,
by George H. Christy
Att'y.

UNITED STATES PATENT OFFICE.

HENRY F. MANN, OF ALLEGHENY, PENNSYLVANIA.

MACHINE FOR MAKING CAR-WHEELS.

SPECIFICATION forming part of Letters Patent No. 414,423, dated November 5, 1889.

Application filed August 23, 1889. Serial No. 321,712. (No model.)

*To all whom it may concern:*

Be it known that I, HENRY F. MANN, a citizen of the United States, residing at Allegheny, in the county of Allegheny and State of Pennsylvania, have invented or discovered certain new and useful Improvements in Machines for the Manufacture of Car-Wheels, of which improvement the following is a specification.

The invention described herein relates to certain improvements in the machine for forming the tires of car-wheels described and shown in Letters Patent No. 373,777, dated November 11, 1887.

The purpose of the machine set forth in said Letters Patent is to form, by successive or simultaneous operations an inwardly-projecting rim on one edge and an outwardly-projecting flange on the opposite edge of an annular band of metal, thereby producing a tire having a flange of a single thickness of metal.

As set forth in an application, Serial No. 318,908, filed July 27, 1889, thin flanges produced in the machine above referred to are objectionable, as they are not capable of properly guiding a wheel in passing over frogs, switches, crossings, &c.

The object of the invention described herein is to so construct the rollers employed in said machine as to form on the edge of an annular band or of the turned-over portion of a disk of wrought-iron or steel a flange corresponding as regards its outer surfaces to the dimensions and contour of the flange of a standard car-wheel.

The invention claimed is hereinafter fully described.

In the accompanying drawings, forming a part of this specification, Figure 1 is a view in side elevation of a machine embodying my invention. Fig. 2 is a detail view, on an enlarged scale, of the rolls employed in forming a flange on the edge of the turned-over portion of a disk. Fig. 3 is a similar view of rolls for forming the flange on the edge of an annular band, and Fig. 4 is a sectional view of a portion of an annular band partially shaped by suitable dies.

As described and shown in the Letters Patent hereinbefore referred to, the machine consists of a base 1, provided with posts or pillars 2, supporting the top plate 3. On the base are formed pivotal bearings or steps 4, in which are mounted the lower ends of the vertical shafts 5 $5^a$ and 6 $6^a$, which project up through suitable slots in the top plate. These shafts 5 $5^a$ are provided with intermeshing gear-wheels 7, and the shafts 6 $6^a$ with similar gear-wheels 8, the gear-wheels 7 and 8 of the shafts $5^a$ and $6^a$ intermeshing with a gear-wheel 9, connected with any suitable driving mechanism. On the upper ends of the shafts 6 $6^a$ are secured rolls 10 $10^a$, the former having a vertical length and contour of face corresponding to the tread of the wheel or tire to be formed. The roll $10^a$ is made of such a vertical length of face as will permit it to have a firm bearing on the inner face of the tread portion and at the same time permit the web of the wheel to pass freely above; but when shaping tires the roll $10^a$ is made sufficiently long, as indicated in dotted lines in Fig. 1, to serve as an anvil over which the inwardly-projecting rim to be formed on one edge of annular band is bent by the action of the conical roll 11. This roll 11 is loosely mounted on a pin secured to a curved swinging bar 12, having end bearings in the standards 13. A segmental rack 14 is attached to one end of the bar 12, and is adapted to engage a pinion 15 on the shaft 16, which is rotated by a suitably-arranged crank and connecting-gearing. The roll 10 should be grooved at its lower end, as shown in Fig. 1, for the reception of the flange as it is formed.

When forming wheels of sheet or plate metal, the edge of disks of suitable dimensions are first turned over at right angles, or approximately so, to the body of the disk, which may be dished at the same time, if desired. The turned-over portion is then inserted between the rolls 10 $10^a$ and 17 $17^a$ and the former pair of rolls are caused to take a firm bearing on said turned-over portion. As the metal disk is rotated by the rolls 10 $10^a$, the roll 17 is moved inwardly sufficiently far to take a firm bearing against the outer face of the turned-over portion. The roll 17 has an overhanging ledge 18 at its upper end adapted to project over the edge of the disk and prevent any upward movement thereof. Near its lower end the roll 17 has a groove 19 formed therein, corresponding in contour and dimensions to the flange to be formed, preferably to the flange of a standard car-wheel. The roll 17ª is provided near its lower end with a tongue or collar 20, adapted to force the metal into the groove 19 of the roll 17. As the disk is rotated by the rolls 10 10ª, the roll 17ª is moved outwardly, thereby forcing the metal into the groove 19 and causing the turned-over portion of the disk to conform in vertical lines to the contour of the roll 17. The turned-over portion of the disk is made sufficiently wide to be turned over the tongue 20 when the latter is forced into the groove 19, thereby forming a double-walled flange, as shown in Figs. 1 and 3. The rolls 17 17ª are secured to the upper ends of the shafts 5 5ª, and said shafts and the shafts 6 6ª are shifted laterally by screws connected to the shafts by yokes, as shown and described in the Letters Patent No. 373,777.

If desired, the turned-over portions of the disks, when forming wheels, and of the bands, when forming tires, may be partially shaped, as shown in Fig. 4, by suitable dies before being subjected to the operation of the machine.

I claim herein as my invention—

In a machine for forming flanges of plate or sheet metal car-wheels or car-wheel tires, the combination of two revoluble rolls adapted to rotate the wheel or tire and two revoluble rolls laterally movable, one of said rolls being grooved, as described, and the other roll being provided with a tongue or collar, substantially as set forth.

In testimony whereof I have hereunto set my hand.

HENRY F. MANN.

Witnesses:
DARWIN S. WOLCOTT,
WILLIAM BEAL.